Aug. 5, 1930.   H. A. CALDERWOOD   1,772,241
OUTLET BOX CONNECTION
Filed Oct. 13, 1928   3 Sheets-Sheet 1

WITNESS
A B Wallace

INVENTOR
Hugh A. Calderwood,
by Christy & Christy
attys.

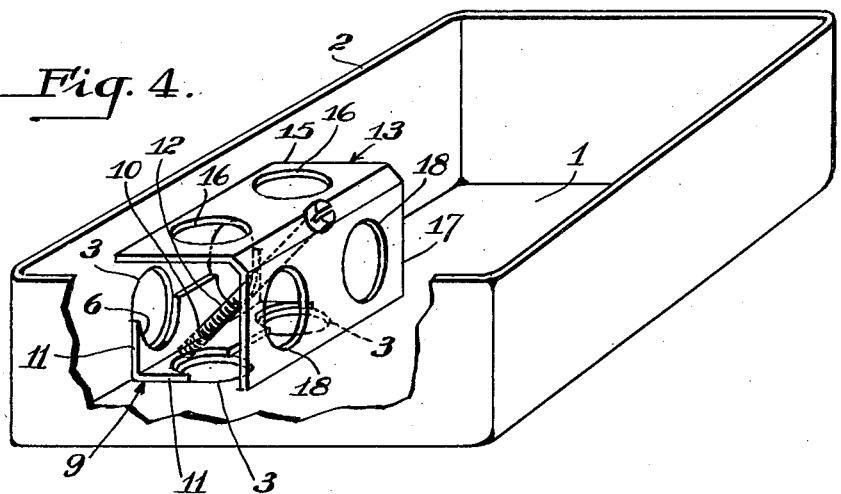
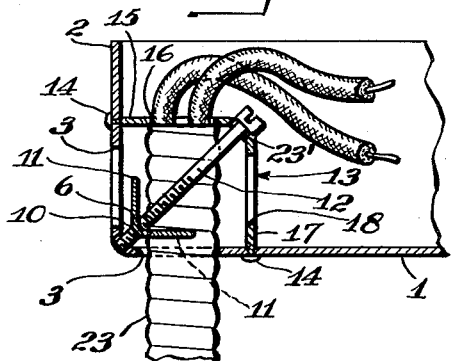
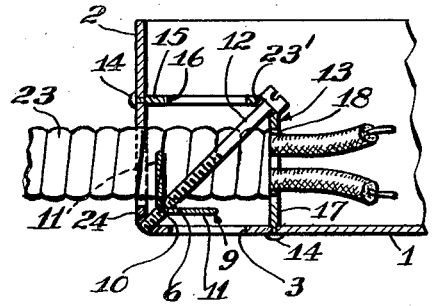
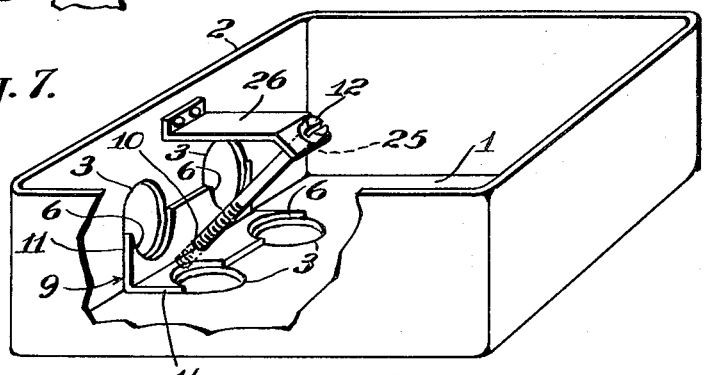

Aug. 5, 1930. H. A. CALDERWOOD 1,772,241
OUTLET BOX CONNECTION
Filed Oct. 13, 1928 3 Sheets-Sheet 3

WITNESS
A B Wallace

INVENTOR
Hugh A. Calderwood,
by Christy & Christy,
attys.

Patented Aug. 5, 1930

1,772,241

UNITED STATES PATENT OFFICE

HUGH A. CALDERWOOD, OF PITTSBURGH, PENNSYLVANIA, ASSIGNOR TO NATIONAL ELECTRIC PRODUCTS CORPORATION, A CORPORATION OF DELAWARE

OUTLET-BOX CONNECTION

Application filed October 13, 1928. Serial No. 312,245.

Figure 1:
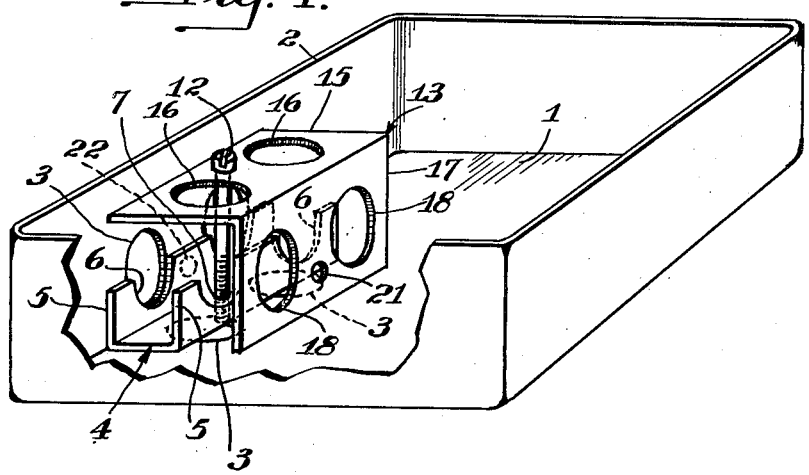
Figure 3:
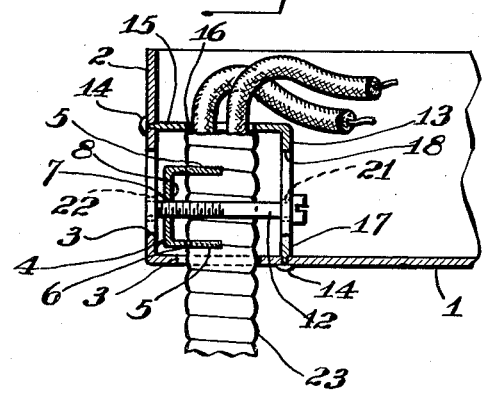
Figure 2:
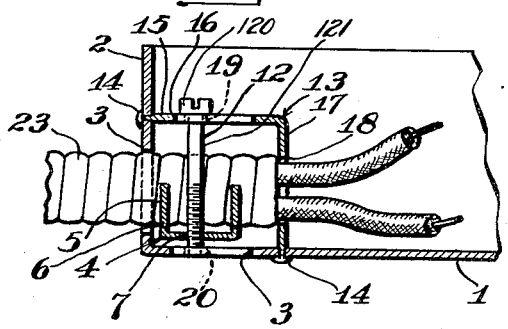
Figure 8:
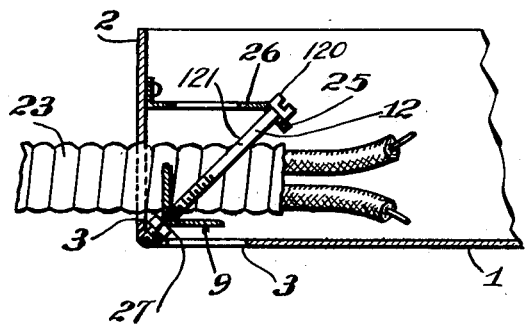
Figure 9:
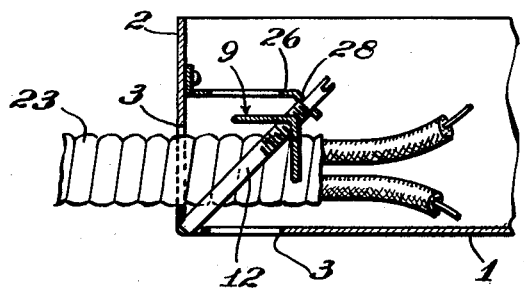
Figure 10:
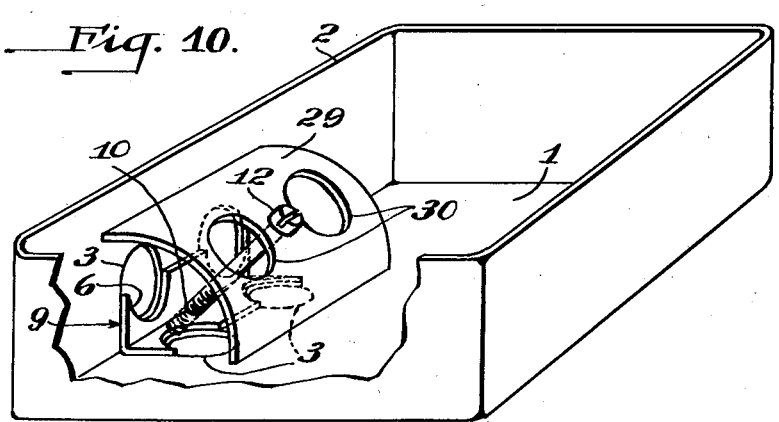

In the accompanying drawings Figure 1 is a perspective view of an uncovered outlet-box, with its wall broken away on one side, showing one embodiment of the invention. Figure 2 is a sectional elevation of the structure of Figure 1 showing a cable introduced through the side wall of the box, and Figure 3 shows the same structure with a cable introduced through the floor of the box. Figures 4, 5 and 6 are corresponding views showing another embodiment of the invention. Figure 7 is a perspective view showing a modification of the structure of Figure 4. Figure 8 is a sectional elevation of the structure of Figure 7 showing a slight variation capable of use in any of the embodiments of the invention herein shown. Figure 9 is a like view showing another such variation. Figure 10 is a perspective view similar to Figure 4 showing still another embodiment of the invention.

The body of the box, shown only conventionally, comprises the floor 1 and peripheral side walls 2, both floor and side wall having the usual knockout openings 3. The clamping-member may be of any suitable form. In Figures 1, 2 and 3 I have shown it as similar to the clamping-member shown and described in Letters Patent No. 1,638,510, being a channel section 4, the opposite parallel flange portions 5 of which are provided with aligned notches 6 adapted to engage the cable, and having a threaded hole 7 in its mid portion 8 between the pairs of aligned notches. In the other figures of the drawings the clamping-member is shown as an angle section 9, having the cable-engaging notches 6 in each wing and the inclined threaded hole 10 in the apex or the line of intersection of the wings 11 of the angle 9.

It is intended to operate the clamping-member from the inside of the box, and therefore I combine with the clamping-member a screw 12 having a head 120 and a threaded shank engaging the thread in the hole in the clamp, the screw being so supported within the box that it has no longitudinal travel of its own, but causes the clamp to move in the manner of a traveling nut. In the structure of the said Letters Patent No. 1,638,510 the clamping-member is operated in that manner, but the screw upon which it is caused to travel is projected through either the side-wall or the back-wall of the box with its head bearing against the exterior face of such wall, and consequently it must be operated from the outside of the box, which is often difficult, and in many situations impossible.

Heretofore in the usual structures where a clamping-screw and clamp are operated from the inside of the box, the clamping-screw projects through an unthreaded hole in the clamping-member and the threaded portion of its shank engages a threaded hole in the wall of the box, so that the head of the screw bears upon the clamping-member and the clamping-member is thrust or propelled in the direction of the travel of the screw. In such structures, at least in the case of thin-walled boxes now commonly used, the tip and more or less of the shank of the screw is necessarily caused to project through the wall of the box, sometimes to a very considerable extent. Since many outlet-boxes are mounted directly on ceilings, joists and other solid portions of buildings, the protruding end of the screw prevents the floor of the box from firmly seating upon the surface to which it is attached, often necessitating the expense and labor of boring a hole in the proposed seat in order to receive the end of the screw. If the screw is not tightened before the box is seated, and a hole is not bored to receive the end of the screw, then troubles are certain to occur, such as preventing the box from seating, or bending the screw in order to drive it home sufficiently to clamp the cable, or if the screw is not driven home the cable will not be tightly secured in the box, the latter resulting in a hazardous electrical condition.

By way of contrast, in a structure embodying the present invention, in which the screw 12 which operates the clamping-member has no longitudinal travel, the tip of the screw need not project beyond the outer face of the box, while the clamp may be operated and the cable secured in place by access to the head of the screw through the open face of the box.

Referring first to Figures 1, 2 and 3 of the drawings, any suitable support for the screw 12 may be provided within the box, but I prefer to employ a support such as shown in the drawings, which consists of a rectangular angle-bar 13 set in inverted position, as shown, with the edges of the wings of the bar secured respectively to the side wall and the floor of the box by any suitable means, as by the ears 14 projected through openings in the box wall and bent over, or riveted, as shown. In the horizontal wing 15 of the bar 13 there are formed openings 16 for the cables in alignment with the knockout openings 3 in the floor of the box, and in the vertical wing 17 there are openings 18 for the cables in alignment with the knockouts 3 in the side wall of the box. Between the cable-openings 16 in the horizontal wing 15 of the bar 13 there is formed an unthreaded aperture 19, to receive the shank of the screw 12, and in the floor of the box between the knockout openings 3 there is formed an aperture 20 in alignment with the opening 19, to receive the tip of the screw 12; and in the vertical wall 17 and in the side wall of the box there are corresponding unthreaded apertures 21 and 22, to receive the screw 12 when it is in horizontal position. It will be understood, however, that the function of the apertures 20 and 22 in the box wall is only to center the screw 12 and prevent lateral deflection. Hence any suitably formed bearing-surface may be substituted for these wall apertures, and in some cases no anti-deflecting means at all will be necessary.

As shown in Figure 2 the screw 12 may be passed vertically through the opening 19 in the wing 15 of the bar 13 and its threaded shank then threaded through the threaded hole 7 in the clamping-member 4, with its tip protruding loosely into but not through the hole 20 in the floor of the box. The armored cable 23 is shown as passed through one of the knockout openings 3 in the side wall of the box, with the cut-away end of its armor resting against the rear face of the vertical wing 17 of the bar 13, and the insulated conductors projected through the opening 18 in the vertical wing 17. Then by turning the screw 12 the clamping-member 4 is caused to travel upwardly upon the threaded shank of the screw so as to bind the armored section of the cable tightly in place against the edge of the knockout opening 3 through which it is passed. In Figure 3 there is shown a like arrangement with the armored cable passed through one of the knockout openings 3 in the floor of the box, and the clamping-member drawn horizontally inwardly upon the threaded shank of the screw 12, to bind the armored portion of the cable tightly in the edge of the knockout opening 3 through which it is passed.

In Figures 4, 5 and 6 I have illustrated another embodiment of the invention in which a single clamping member and a single operating screw are so arranged as to secure the cable or cables in place when introduced through either the bottom openings or the side openings in the box, and without shifting the position of the clamping member and screw. I have shown the angle bar 13 set in position just as is described in connection with Figures 1, 2 and 3. The clamping member 9 in this case is an angle section having cable-engaging notches 6 in each wing and the inclined threaded hole 10 in the apex or the line of intersection of the wings 11 of the angle 9. The screw 12 in this case is set in inclined position, and in the organization herein shown at substantially an angle of forty-five degrees to both the side wall and the floor of the box. The unthreaded hole or aperture 23' is formed in the apex or line of intersection of the wings 15 and 17 of the angle bar 13, in which aperture the screw is freely rotatable, and the threaded aperture 10 is formed in the apex or line of intersection of the wings 11 of the angle member 9. The unthreaded aperture 24 to receive and center the tip of the screw is formed in the apex or line of intersection of the side wall 2 and the floor 1 of the box. In Figure 5 the cable is shown as introduced through the side wall of the box just as has been described in connection with Figure 2. When the cable has been so introduced, by rotating the screw 12 the clamping member 9 is caused to travel upwardly and bind the cable firmly against the edge of the knockout opening 3 in the side wall, as shown. In Figure 6 the cable is shown as introduced through the knockout opening 3 in the floor of the box, just as shown and described in connection with Figure 3. In this case also by rotating the screw 12 the clamping member is caused to travel upwardly upon the threaded shank of the screw and thus to exert horizontal pressure upon the cable and bind it firmly against the edge of the knockout, as shown.

In Figure 7 I have shown an obvious modification of the structure of Figure 4, 5 and 6, in which case the angle bar 13 has been replaced by a single shelf 26 secured to the side wall 2 of the box and having its end portion inclined downwardly at an angle of about forty-five degrees, and provided with an unthreaded hole or aperture 25 to receive the screw 12.

It will be obvious that in the embodiment of the invention shown in Figures 4, 5, 6 and 7 the tension exerted by the clamping member upon the cable is an inward tension, that is to say, the tendency is to draw the cable into the box, as distinguished from the purely transverse tension exerted by the clamping member in the said Letters Patent No. 1,638,510, and also characteristic of the embodiment of the invention shown in Figures 1, 2 and 3 herein.

In Figures 8 and 9 I have shown two obvious variations, and consequently equivalents, of the structure shown in Figure 7, either or both of which variations may be made in the other structures herein shown and described.

It is obvious that instead of threading the hole or aperture 7 in the channeled clamping-member 4 or the hole 10 in the angular clamping-member 9, the hole in the clamping-member may be unthreaded and a threaded nut may be mounted upon the threaded shank of the screw 12 immediately behind the clamping-member, which nut in its travel upon the screw will push the clamping-member into clamping engagement with the cable. Such a traveling nut 27 is shown in Figure 8. Although this nut may be physically not a part of the clamping-member, it is functionally a part of said member or an attachment thereto. Consequently in the appended claims, wherein it is stated that the clamping-member is in threaded engagement with the threaded shank of the operating screw, I intend to cover not only direct threaded engagement, but also an indirect threaded engagement such as that last above described.

It is also obvious that the direction of travel of the clamping-member relatively to the cable may be reversed, in any of the structures herein shown, without departure from the invention. Such a modification is shown in Figure 9. In this case the threaded shank of the screw 12 has a shoulder 28 formed upon it which bears against the downwardly inclined end portion of the shelf 26, and the angle clamping member 9 is mounted on the threaded shank of the screw 12 above or on the opposite side of the conductor inserted through the box wall, as the case may be. It is obvious that by turning the screw the clamping member is caused to travel toward the box wall (instead of inwardly therefrom, as before) and to bind the conductor in place, as already described.

In Figure 10 I have shown another modification wherein the rectangular angle bar 13, shown in Figures 1–6, inclusive, is replaced by a bar 29 of segmental form, having two openings 30 in its wall. The screw 12 and clamping member are operated as shown and described in connection with Figures 4–7, inclusive. In this case the holes 30 may be used for the passage of a conductor, whether inserted through the side wall or through the bottom wall of the box.

It will be obvious that the invention is not limited in respect of the specific structure which may be employed to support and guide the head end of the operating screw 12. Either wing of the angle bar 13 shown in Figures 1, 2 and 3 may be omitted, and as indicated in Figure 7 the angle bar 13 may be replaced by the single shelf member 26. And generally, any member suitably secured to either the side wall or the floor of the box, or formed integrally therewith, may be employed for supporting and guiding the head of the screw. Therefore in the appended claims I have used the term "shelf" in a broad sense as indicating not only the specific forms of support shown in the drawings, but all other suitable and equivalent forms.

I claim as my invention:

1. The combination with an outlet-box for electrical conductors having an opening in its wall, of a shelf secured to and projecting inwardly from the box wall and located at one side of said opening and having an aperture therethrough, a screw having a threaded shank projecting freely through said aperture toward and at an angle to the axis of said opening, and a clamping-member mounted upon and in threaded engagement with said threaded screw-shank, whereby by turning said screw the said clamping-member is caused to travel thereon and to engage and bind a conductor inserted through said wall-opening.

2. The combination with an outlet-box for electrical conductors having an opening in its wall, of a shelf secured to and projecting inwardly from the box wall and located at one side of said opening and having an aperture therethrough, a screw having a head larger than said aperture and a threaded shank projecting freely through said aperture at an angle to and beyond said opening, and a clamping-member mounted upon and in threaded engagement with said threaded screw-shank on the opposite side of said opening, whereby by turning said screw the said clamping-member is caused to travel thereon toward said shelf and to engage and bind a conductor inserted through said wall-opening.

3. The combination with an outlet-box for electrical conductors having an opening in its wall, of a shelf secured to and projecting inwardly from the box wall and located at one side of said opening and having an aperture therethrough, a seat in the box wall on the opposite side of said opening, a screw having a threaded shank projecting freely through said shelf-aperture and having its opposite end rotatable in said seat and a clamping member mounted upon and in threaded engagement with said threaded screw-shank between its ends, whereby by turning said screw the said clamping-member is caused to travel thereon and to engage and bind a conductor inserted through said wall-opening.

4. The combination with an outlet-box for electrical conductors having a bottom-wall, a side-wall, and an opening in each wall for the passage of an electrical conductor, of a screw inclined inwardly and upwardly from the line of intersection of said walls, fixed means within the box for supporting the upper portion of said screw in freely rotatable relation, a thread on the shank of said screw, and a clamping-member mounted upon and in threaded engagement with said threaded screw-shank, whereby by turning said screw the said clamping-member is caused to travel thereon and to engage and bind a conductor inserted through either of said openings.

In testimony whereof I have hereunto set my hand.

HUGH A. CALDERWOOD.